United States Patent
Georgeson et al.

(10) Patent No.: US 11,435,323 B2
(45) Date of Patent: Sep. 6, 2022

(54) METHOD AND SYSTEM FOR AUTOMATED ULTRASONIC INSPECTION OF COMPLEX COMPOSITE STRUCTURES WITH NON-PARALLEL SURFACES

(71) Applicant: The Boeing Company, Chicago, IL (US)

(72) Inventors: Gary E. Georgeson, Tacoma, WA (US); William J. Tapia, Kapowsin, WA (US); Barry A. Fetzer, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 340 days.

(21) Appl. No.: 16/717,037

(22) Filed: Dec. 17, 2019

(65) Prior Publication Data
US 2021/0181161 A1   Jun. 17, 2021

(51) Int. Cl.
*G01N 29/265*   (2006.01)
*G01N 29/06*   (2006.01)
(Continued)

(52) U.S. Cl.
CPC .......... *G01N 29/265* (2013.01); *B25J 19/02* (2013.01); *B25J 19/026* (2013.01); *G01B 11/30* (2013.01); *G01N 29/0654* (2013.01); *G01N 29/221* (2013.01); *G01N 29/24* (2013.01); *G10K 11/35* (2013.01); *G10K 11/352* (2013.01); *G10K 11/355* (2013.01); *G01N 2291/0231* (2013.01); *G01N 2291/101* (2013.01); *G01N 2291/102* (2013.01); *G01N 2291/106* (2013.01); *G01N 2291/269* (2013.01); *G01N 2291/2638* (2013.01)

(58) Field of Classification Search
CPC .... G01N 29/265; G01N 29/221; G01N 29/24; G01N 29/0654; G01N 2291/0231; G01N 2291/101; B25J 19/026; B25J 19/02; G10K 11/352; G10K 11/355; G10K 11/35; G01B 11/30
USPC .................................................... 73/634, 633
See application file for complete search history.

(56) References Cited

U.S. PATENT DOCUMENTS

| | | | | |
|---|---|---|---|---|
| 8,371,171 B2 * | 2/2013 | Isobe | ................... | G01N 29/265 73/602 |
| 2013/0160551 A1 * | 6/2013 | Miura | ................... | G01N 29/262 73/598 |

(Continued)

FOREIGN PATENT DOCUMENTS

WO   WO-2010037223 A1 *   4/2010   ............. G01B 17/06

*Primary Examiner* — Lisa M Caputo
*Assistant Examiner* — Rose M Miller
(74) *Attorney, Agent, or Firm* — Coats & Bennett, PLLC

(57) ABSTRACT

Methods, systems and apparatuses are disclosed for non-destructively a substrate using ultrasound waves, and enhancing resolution of imaging created from ultrasound signals that are back reflected from a substrate surface second, or back surface by maintaining the incident angles of the ultrasonic beams at the substrate second surface such that the ultrasonic beams strike the substrate second surface at an angle that is substantially perpendicular to the complex geometric profile of the substrate second surface by supplying known spatial coordinates to the system to maintain the incident angles of the ultrasonic beams at a predetermined angle relative to the substrate second surface.

21 Claims, 8 Drawing Sheets

(51) Int. Cl.
  *G01N 29/24*   (2006.01)
  *G01B 11/30*   (2006.01)
  *G10K 11/35*   (2006.01)
  *B25J 19/02*   (2006.01)
  *G01N 29/22*   (2006.01)

(56) References Cited

U.S. PATENT DOCUMENTS

| | | | |
|---|---|---|---|
| 2013/0192374 A1* | 8/2013 | Voor, Jr. | G01N 29/11 |
| | | | 73/627 |
| 2014/0283611 A1* | 9/2014 | Habermehl | G10K 11/346 |
| | | | 73/602 |
| 2019/0154561 A1 | 5/2019 | Tat et al. | |
| 2019/0302062 A1 | 10/2019 | Fetzer et al. | |

* cited by examiner

METHOD AND SYSTEM FOR AUTOMATED ULTRASONIC INSPECTION OF COMPLEX COMPOSITE STRUCTURES WITH NON-PARALLEL SURFACES

TECHNOLOGICAL FIELD

The present disclosure relates generally to the field of non-destructive inspection techniques for structures. More specifically the present disclosure relates to the field of non-destructive inspection techniques for structures having complex surface geometries.

BACKGROUND

Ultrasound is a non-destructive inspection method useful in the inspection of structures, including composite structures. Ultrasonic inspections send ultrasonic signals into a structure and the ultrasonic ultrasound response signals are analyzed to inspect the structure.

To inspect a structure using ultrasound methodology, the front and back surfaces of the structure are typically parallel to one another, with the front and back surfaces of the structure typically being substantially smooth.

SUMMARY

According to one aspect, a method is disclosed including orienting an ultrasonic array proximate to a substrate, with the substrate including a first surface of the substrate and a second surface of the substrate with the second surface of the substrate comprising a complex substrate second side geometry. According to the disclosed method the substrate second side complex geometry includes a substrate second side complex geometry profile. The ultrasonic array is configured to include a transducer and a receiver. The method further includes orienting a controller in communication with the ultrasonic probe, with the controller configured to access the substrate second side complex geometry profile, accessing the substrate second side complex geometry profile, and controlling the orientation of the ultrasonic array in response to the substrate second side complex geometry profile. The method further includes directing ultrasonic energy from the ultrasonic array in response to the substrate second side complex geometry profile at a particular specific and directing ultrasonic energy from the ultrasonic array to the substrate and through the first surface of the substrate to the second surface of the substrate, and directing back reflection ultrasonic energy from the second surface of the substrate to the receiver. The method further includes receiving back reflection ultrasonic energy from the second surface of the substrate at the receiver, and wherein the receiver is positioned to receive back reflection ultrasonic energy from the second surface of the substrate in response to the substrate second side complex geometry profile.

In another aspect, the method further includes scanning the ultrasonic array in a predetermined direction relative to the first surface of the substrate in response to the substrate second side complex geometry profile.

In a further aspect, accessing the complex geometry profile comprises accessing complex geometry profile information at a pixel level.

In another aspect, the substrate second side complex geometry includes a non-planar geometry.

In a further aspect, the complex geometry includes an irregular geometry.

In another aspect, the complex geometry includes an irregular contour.

In a further aspect the complex geometry is a 3-D complex geometry profile.

In a further aspect, according to a disclosed method, in the step of directing ultrasonic energy from the ultrasonic array in response to the substrate surface second side complex geometry profile, further comprising directing ultrasonic energy from the transducer to the second surface of the substrate in an orientation that is perpendicular to the second surface of the substrate.

In another aspect, according to a disclosed method, in the step of directing back reflection ultrasonic energy from the second surface of the substrate to the receiver, further comprising directing back reflection ultrasonic energy from the second surface of the substrate to the receiver in an orientation that is perpendicular to the second surface of the substrate.

In a further aspect, in the step of accessing the complex geometry profile, with the complex geometry profile accessed from a memory.

In another aspect, the controller is in communication with a robotic array.

in another aspect the controller is integrated into the robotic array

In another aspect, the robotic array includes a robotic arm, with the robotic arm configured to move the ultrasonic probe relative to the first surface of the substrate.

In another aspect, the robotic array includes a robotic arm, with the robotic arm configured to orient the ultrasonic probe relative to the second surface of the substrate and in response to the complex geometry profile.

According to a further aspect, a method is disclosed for non-destructively inspecting a substrate including orienting an ultrasonic array proximate to a substrate, said substrate comprising a first surface of the substrate and a second surface of the substrate, with the second surface of the substrate comprising a substrate surface second side complex geometry, and with the substrate second side complex geometry comprising a substrate second side complex geometry profile. The method further includes, the ultrasonic array comprising a transducer and a receiver, and orienting a scanning device configured to dimensionally scan the second surface of the substrate and scanning the second surface of the substrate complex geometry profile, and providing a controller in communication with the ultrasonic array, with the controller further in communication with the scanning device. The method further includes accessing the substrate second side complex geometry profile obtained by the scanning device in substantially real time, and controlling the ultrasonic array in response to the complex geometry profile obtained by the scanning device in substantially real time, and directing ultrasonic energy from the ultrasonic array to the substrate and through the first surface of the substrate to the second surface of the substrate. The method further includes orienting the ultrasound array and directing ultrasonic energy from the ultrasonic array in response to the substrate second side complex geometry profile. The method further includes directing back reflection ultrasonic energy from the second surface of the substrate to the receiver, and receiving back reflection ultrasonic energy from the second surface of the substrate at the receiver, and wherein the receiver is positioned to receive back reflection ultrasonic energy from the second surface of the substrate in response to the substrate second side complex geometry profile.

The method further includes directing ultrasonic energy from the ultrasonic array in response to the substrate second side complex geometry profile at a particular specific location, for example, at a pixel-by-pixel basis, and directing ultrasonic energy from the ultrasonic array to the substrate and through the first surface of the substrate to the second surface of the substrate, and directing back reflection ultrasonic energy from the second surface of the substrate from a particular specific location, for example, at a pixel-by-pixel basis, to the receiver. The method further includes receiving back reflection ultrasonic energy from the second surface of the substrate at the receiver, and wherein the receiver is positioned to receive back reflection ultrasonic energy from the second surface of the substrate in response to the complex geometry profile of the second surface of the substrate.

In another aspect the scanning device is a laser.

In a further aspect, the method further includes moving the ultrasonic array in a predetermined direction relative to the first surface of the substrate in response to the substrate second side complex geometry profile.

In a further aspect, the method further includes orienting the ultrasonic array in a predetermined direction relative to the second surface of the substrate in response to the substrate second side complex geometry profile.

In a further aspect, the substrate second side complex geometry is a non-planar geometry.

In a further aspect, in the step of directing ultrasonic energy from the ultrasonic array in response to the complex geometry profile, the method further includes directing ultrasonic energy from the transducer to the second surface of the substrate in an orientation that is substantially perpendicular to the second surface of the substrate during the non-destructive inspection.

In a further aspect, in the step of directing back reflection ultrasonic energy from the second surface of the substrate to the receiver, the method further includes directing back reflection ultrasonic energy from the second surface of the substrate to the receiver in an orientation that is perpendicular to the second surface of the substrate during the non-destructive inspection.

In another aspect, a method is disclosed for an automated back reflection ultrasonic non-destructive inspection of a composite structure having at least one complex composite structure surface such that a first surface of the composite structure relative to a composite structure second side includes a plurality of non-parallel surfaces, with the method including inputting spatial coordination values of non-parallel surfaces into a processor, and controlling movement of a robotic arm, with the robotic arm supporting an ultrasonic array, with the movement of the robotic arm controlled by the spatial coordination values. The method further includes directing an ultrasonic signal from the ultrasonic array at an angle that is substantially perpendicular to a substrate second side and reflecting the ultrasonic signal from the substrate second side to a receiver in the ultrasonic array to maximize collection of back reflection ultrasonic signals from the substrate second side.

In another aspect, a system for non-destructively scanning a substrate is disclosed, with the system including an ultrasonic array, with the ultrasonic array including a transducer and a receiver, and with the ultrasonic array configured to non-destructively inspect a substrate. The substrate is configured to include a first surface of the substrate and a substrate second side, with the second surface of the substrate including a complex geometry profile. The system further includes a controller configured to be in communication with the ultrasonic array, with the controller configured to access the complex geometry profile, and wherein said ultrasonic array is configured to direct ultrasonic energy from the ultrasonic array to the first surface of the substrate, and from the first surface of the substrate through the substrate and to the substrate second side at an angle that is in response to the complex geometry profile.

In another aspect, during the non-destructive inspection of the substrate, the ultrasonic array is further configured to direct ultrasonic energy from the ultrasonic array to the substrate second side at an angle that remains perpendicular to the second surface of the substrate during a non-destructive inspection of the substrate, with the non-destructive inspection of the substrate occurring over at least a portion of the substrate.

In a further aspect, the system further includes components configured to direct ultrasonic energy from the ultrasonic array in response to the substrate second side complex geometry profile at a particular specific location, for example, at a pixel-by-pixel basis, with components configured to direct ultrasonic energy from the ultrasonic array to the substrate and through the first surface of the substrate to the second surface of the substrate, and directing back reflection ultrasonic energy from the second surface of the substrate from a particular specific location, for example, at a pixel-by-pixel basis, to the receiver. The system further includes locating components configured to receive back reflection ultrasonic energy from the second surface of the substrate at the receiver, and wherein the receiver is positioned to receive back reflection ultrasonic energy from the second surface of the substrate in response to the substrate second side complex geometry profile.

In another aspect, the system further includes a robotic array, with the robotic array configured to be in communication with the ultrasonic array and with the robotic array further configured to be in communication with the controller.

In another aspect, the system further includes a scanning device, with the scanning device configured to scan the complex geometry of the substrate second side, with the scanning device configured to be in communication with the controller, and with the scanning device configured to send spatial coordination values of the complex geometry profile of the substrate second side to the controller in substantially real-time.

In another aspect, the system includes a processor in communication with an ultrasonic array receiver, and further includes the processor in communication with a controller, with the processor configured to receive signals sent from the receiver, and the processor configured to send signals to the controller.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
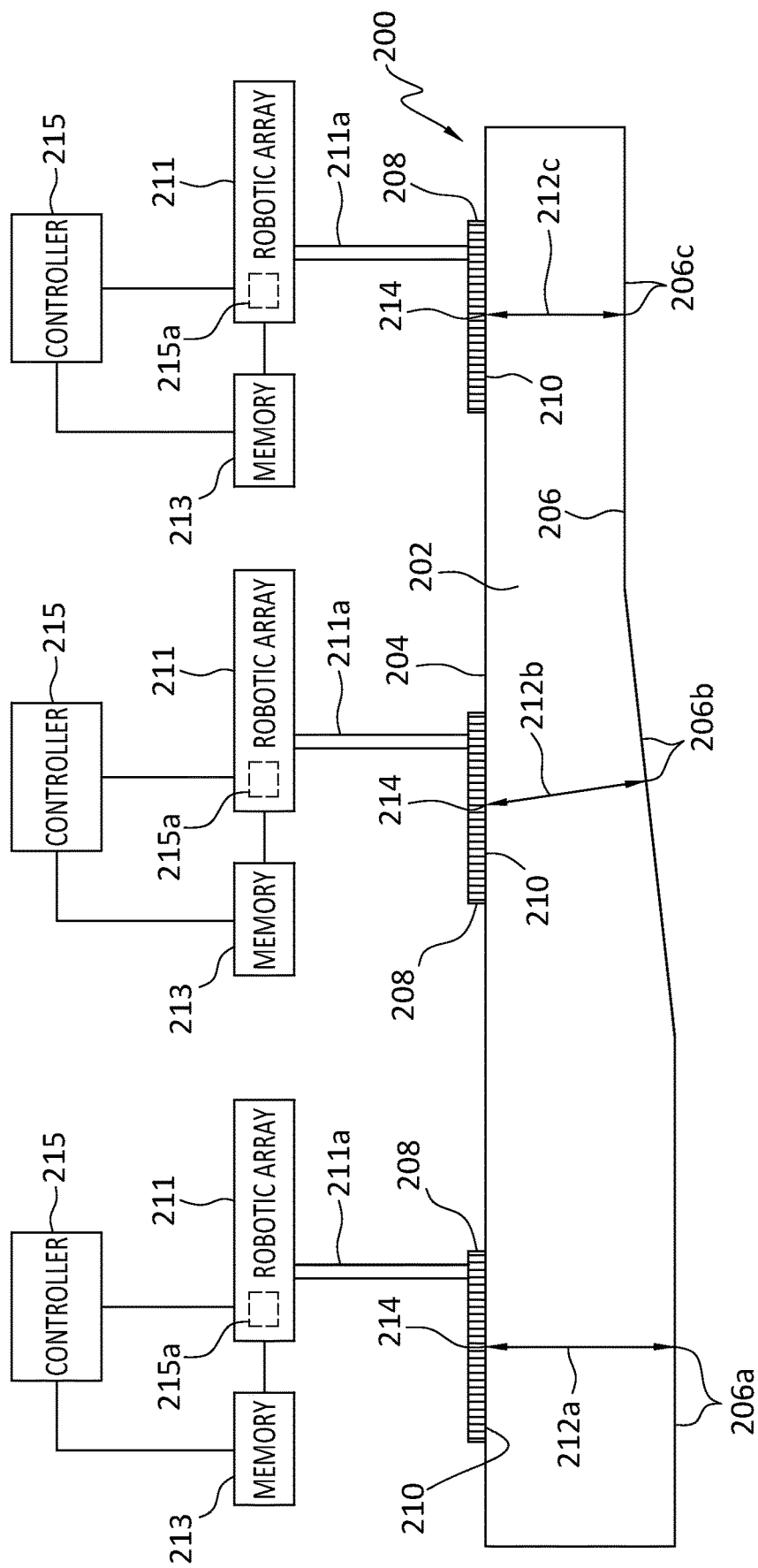
Figure 2:
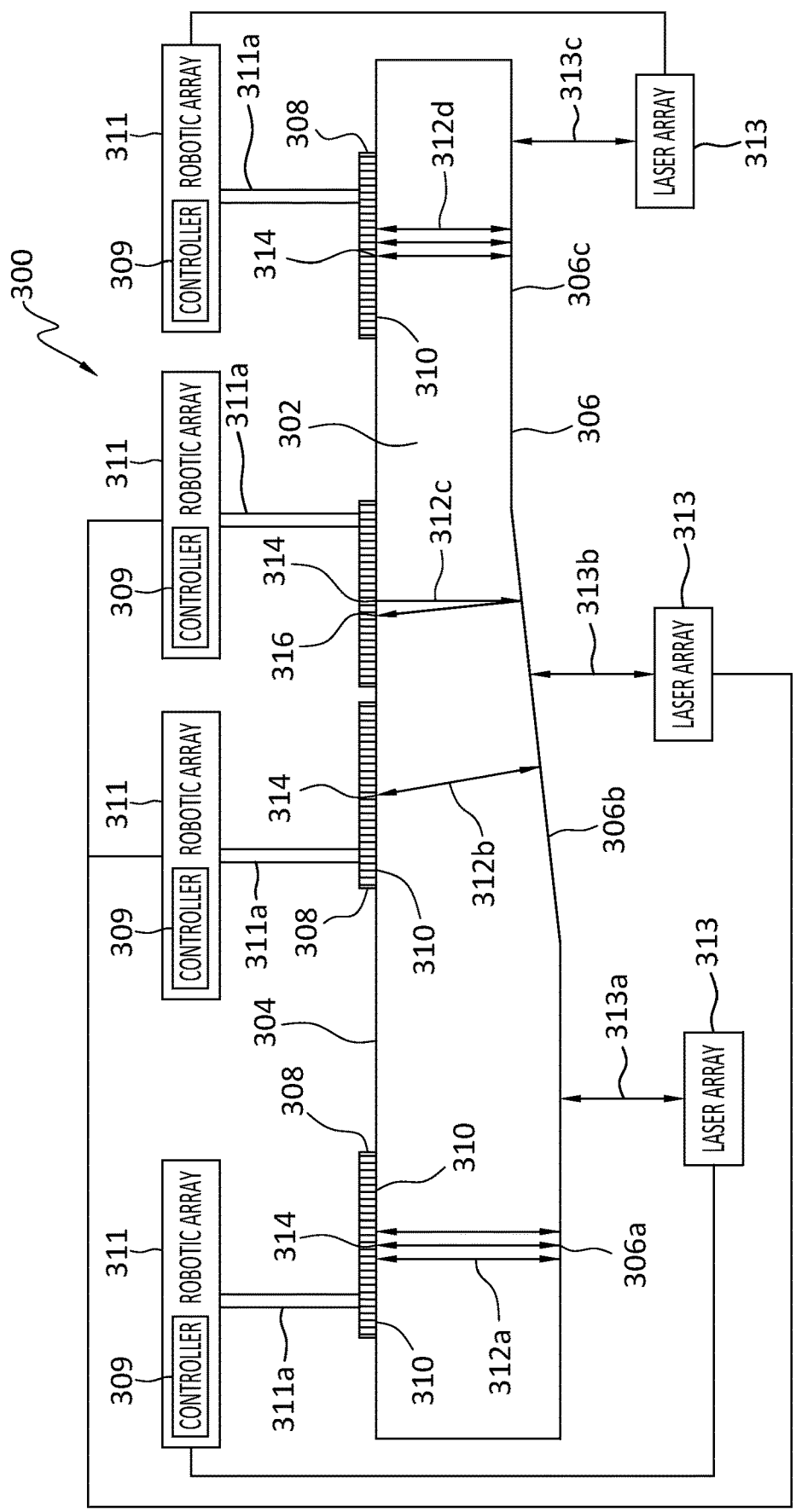
Figure 3:
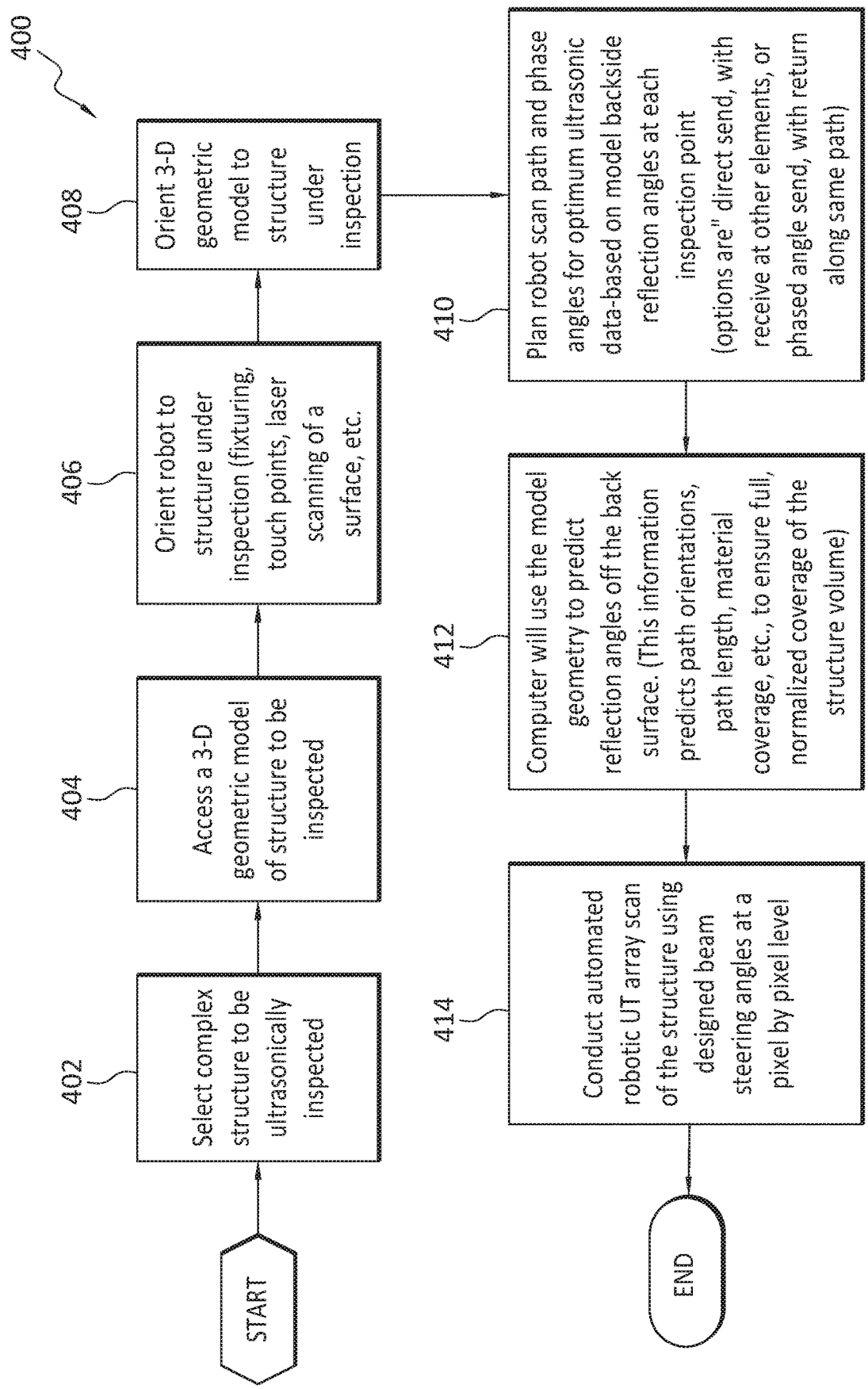
Figure 4:
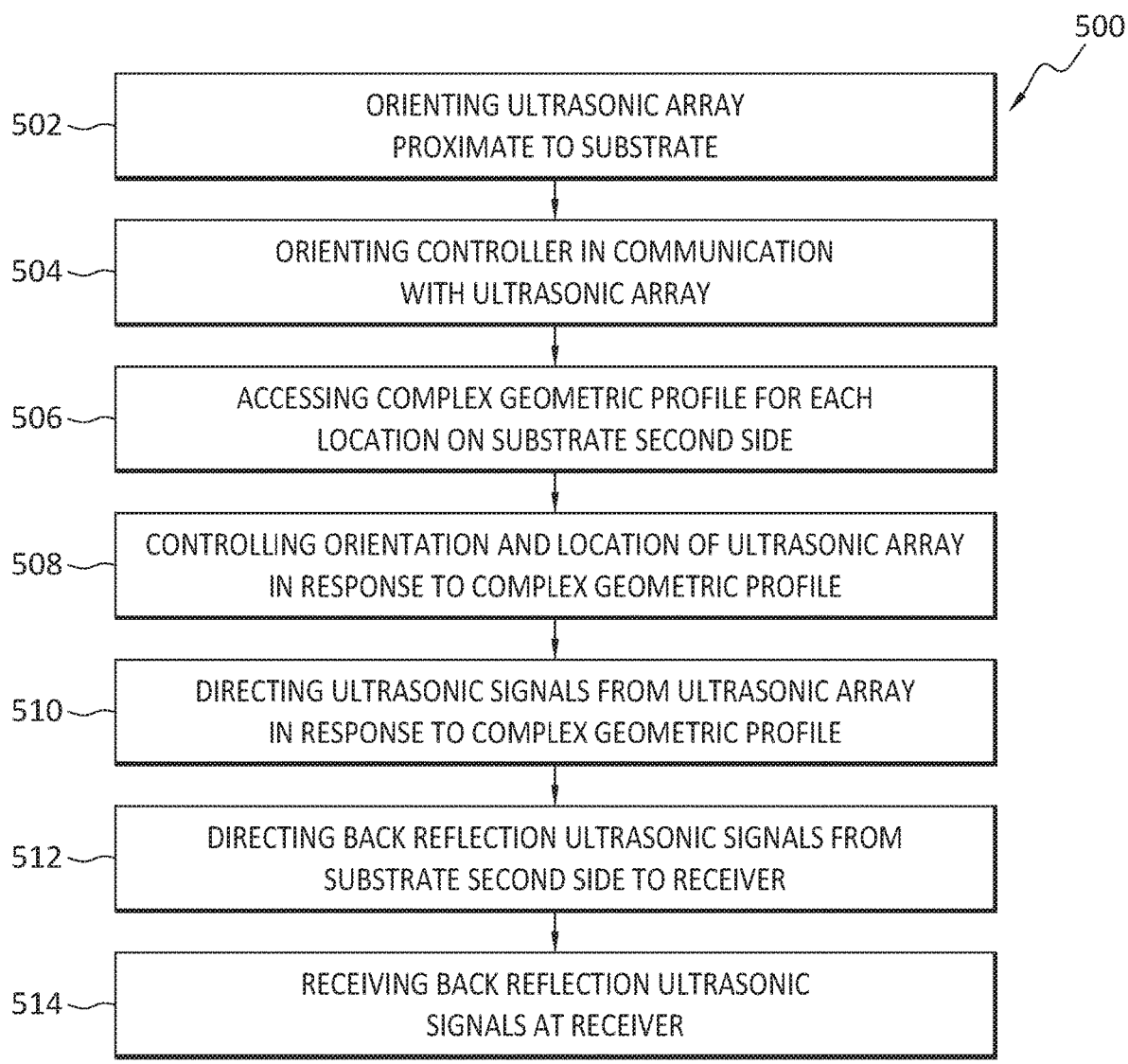
Figure 5:
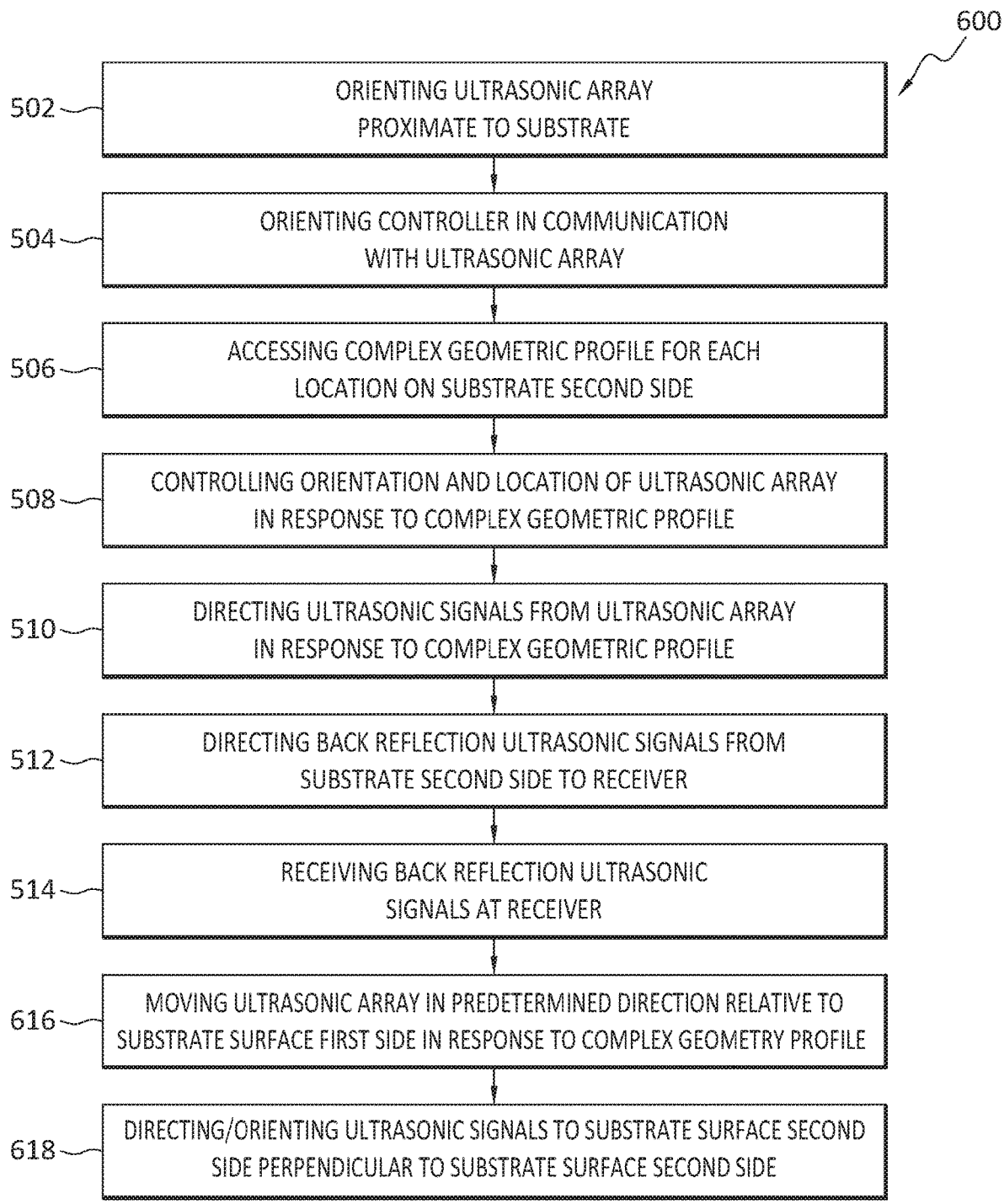
Figure 6:
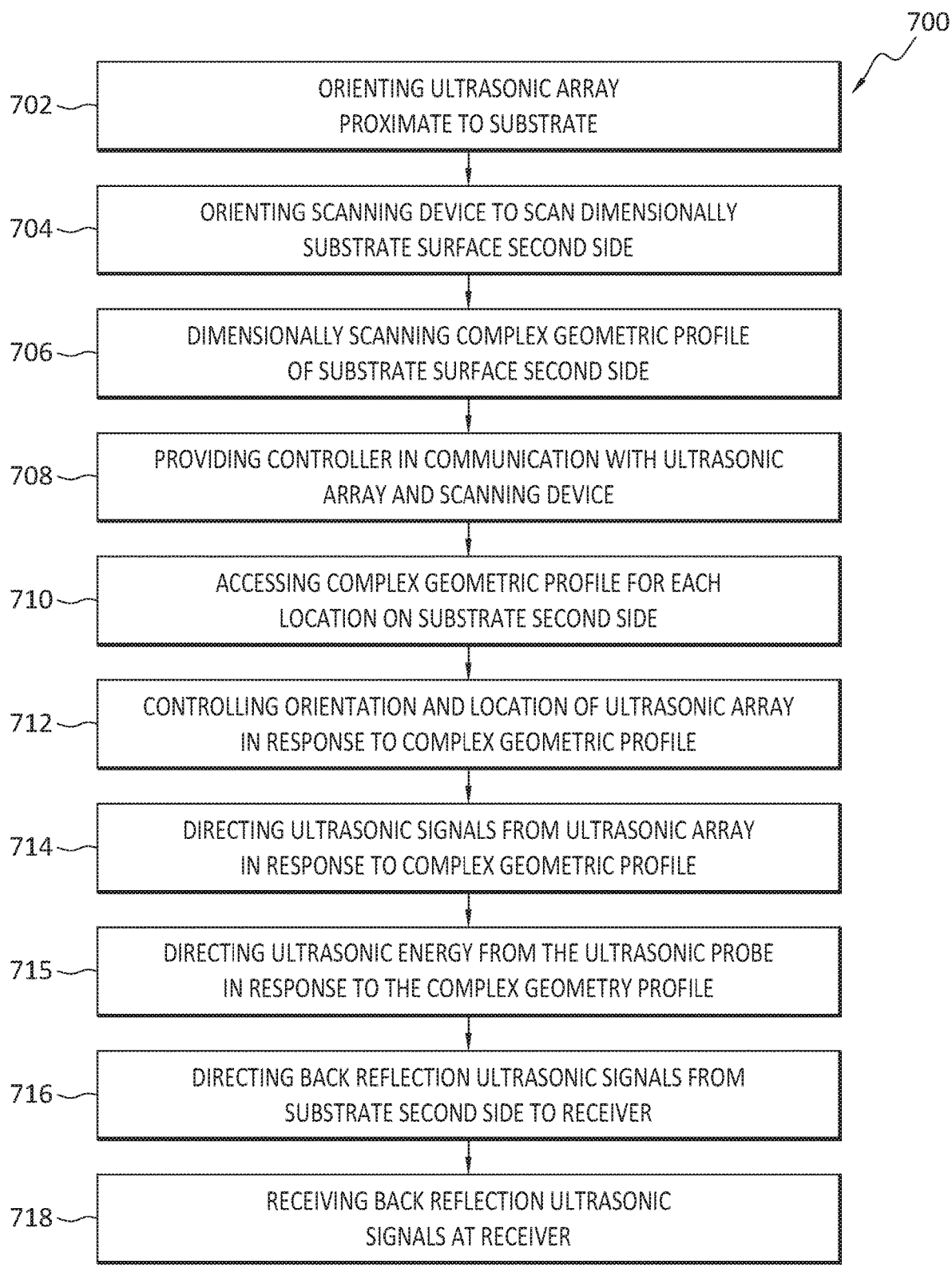
Figure 7:
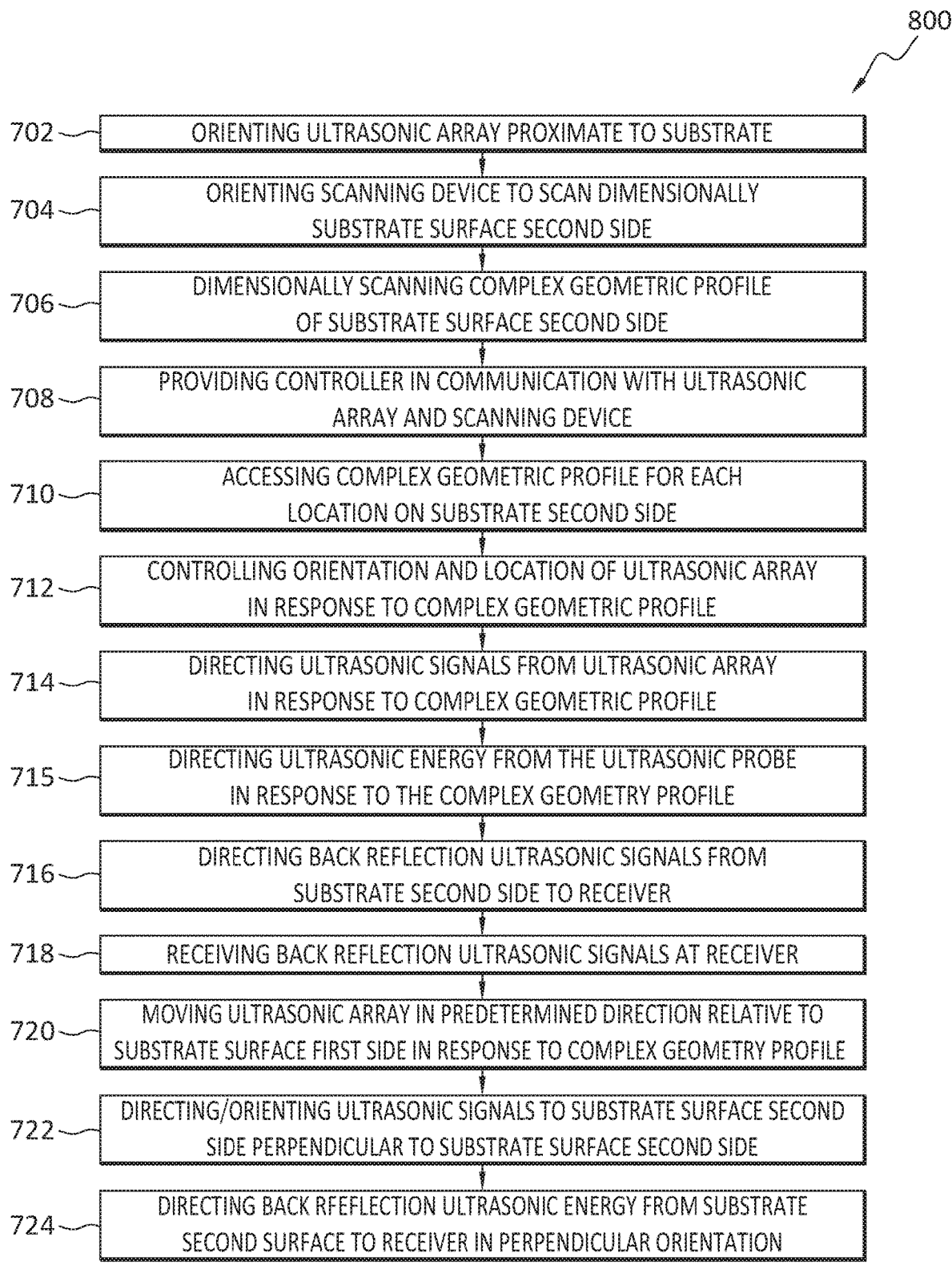

Having thus described variations of the disclosure in general terms, reference will now be made to the accompanying drawings, which are not necessarily drawn to scale, and wherein:

FIG. 1 is a cross-sectional side view of a structure being inspected according to present methods and systems;

FIG. 2 is a cross-sectional side view of a structure being inspected according to present methods and systems;

FIG. 3 is block diagram outlining a non-limiting illustrative method according to present aspects;

FIG. 4 is a flowchart outlining a method according to present aspects;

FIG. 5 is a flowchart outlining a method according to present aspects;

FIG. 6 is a flowchart outlining a method according to present aspects;

FIG. 7 is a flowchart outlining a method according to present aspects; and

Figure 8:
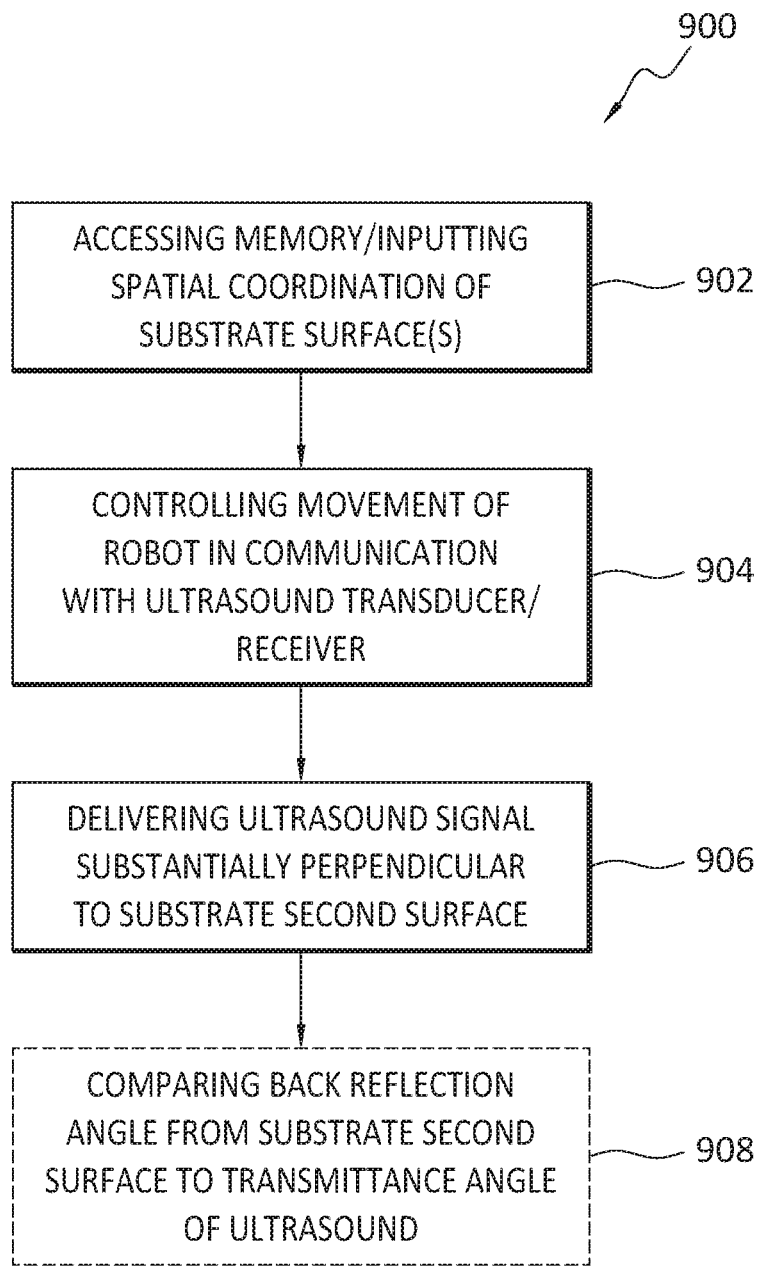

FIG. 8 is a flowchart outlining a method according to present aspects.

DETAILED DESCRIPTION

Ultrasonic back reflection methodologies and systems have proven to be useful techniques for non-destructively testing and otherwise assessing characteristics of various materials, including, for example, composite materials, etc. Back reflection ultrasonic inspection methods can position a transducer array at a first surface of the substrate (e.g., referred to equivalently herein as a "substrate front surface" and "substrate first side") with ultrasonic signals then delivered from the transducer array through the thickness of the substrate material to the substrate second side (e.g. referred to equivalently herein as a "substrate back surface"). Ultrasonic signals are then reflected back from the substrate second side through the substrate and are received at the transducer array that comprises, for example, a receiver or network of receivers in the transducer array.

Accuracy of ultrasonic back reflection systems and methods is impacted by the angles at which ultrasonic energy is delivered (e.g. emitted, etc.) and reflected back from targeted surfaces. That is, for the purpose of achieving a large sampling and improving accuracy and ensuring optimal detection capabilities, according to present aspects, it is presently disclosed that ultrasonic energy is directed in a direction that is as perpendicular as possible with respect to substrate surfaces being evaluated. An ultrasonic transducer array can be positioned to a visible or exposed substrate first surface such that emitted ultrasonic energy can be delivered to the substrate first surface in a direction that is substantially perpendicular to the substrate first surface.

The orientation or geometric profile of a substrate second side (e.g. back surface) may not be known or accessible. Accordingly, if a substrate back surface is not parallel to the substrate front surface, ultrasound signals impacting the back surface will be reflected from the back surface to the transducer array at an angle of deviation from a "normal" angle of incidence (e.g. an angle that deviates from the angle of incidence, etc.). As a result, signal loss at the transducer can occur, and accuracy of the inspection protocol can suffer because a significant amount of returning signal from the back surface can miss the receiver (e.g., the receiver that can be located in the transducer array, etc.).

Presently disclosed methods, systems, and apparatuses provide enhanced ultrasound back reflection inspection of substrates, including composite material substrates, where first and second substrate surfaces are not parallel to one another.

The enhanced ultrasound back reflection inspection of substrates is accomplished, according to present aspects by inputting and/or accessing the determined surface spatial characteristics of a substrate back surface (also referred to herein as the substrate back surface) such as, for example, from a catalog of surface inputted and/or accessible spatial characteristics (also referred to herein as a "geometric surface profile) such that the substrate spatial characteristics are provided to the ultrasound back reflection inspection system and delivering ultrasound energy from a ultrasound transducer array to a substrate back surface at a predetermined transmittance angle that will impact the substrate second surface and reflect back to a receiver (e.g. an ultrasound receiver positioned within or proximate to the ultrasound transducer) at an reflected angle that is substantially equivalent to the transmittance angle. In a further aspect, ultrasound energy is delivered from an ultrasound transducer array to a particular specific location on a substrate back surface, for example, in a pixel-by-pixel basis, at a predetermined transmittance angle that will impact the substrate second surface and reflect back to a receiver (e.g. an ultrasound receiver positioned within or proximate to the ultrasound transducer) at an reflected angle that is substantially equivalent to the transmittance angle.

That is, according to present aspects, a substrate having front and back surfaces that are not parallel to one another (e.g., "non-parallel") can be inspected by the presently disclosed methods, systems, and apparatuses by collecting ultrasound back reflection signals, for example, on a pixel-by-pixel basis, from a substrate second side in a manner that approximates the efficiency of signal collection that occurs as when substrate first and second sides are substantially parallel to one another. As presently disclosed, the present methods, systems, and apparatuses provide the transmittance of ultrasound energy and the receipt of an ultrasound back reflection signal for a specific location on a pixel-by-pixel basis.

According to further present aspects, by adjusting the delivery angle of the ultrasound transmittance according to surface characteristic values of the substrate second surface that are accessed and/or otherwise provided (e.g., inputted, etc.) to the present systems according to present methods, a substrate (e.g., a composite substrate) with non-parallel first and second sides (e.g., non-parallel front and back surfaces) surfaces can be inspected with greatly improved accuracy, at least in terms of greatly improved accuracy in detecting irregularities within the substrates having non-parallel surfaces, as each location on a substrate back surface, on a pixel-by-pixel basis, back-reflects ultrasound energy from each location on the substrate back surface; with each ultrasound beam incident at a substrate back surface specific location back reflected and received by an ultrasound energy receiver.

By determining the substrate second side spatial characteristic values (e.g., referred to equivalently herein as the substrate second side geometric profile values), and providing the substrate second side spatial characteristic values to a controller in communication with mechanical fixtures responsible for the directional delivery of ultrasound energy (e.g., robotic arms configured to automatically alter directional delivery of ultrasound energy from an ultrasound source (e.g., an ultrasound transducer), the ultrasound energy is delivered to the substrate second side in an orientation that is substantially perpendicular to the substrate second side at each position, on a pixel-by-pixel basis, along the substrate second side. "Substantially perpendicular" as used herein connotes a condition wherein the angle of incidence of an energy beam or signal (e.g., ultrasound beam, laser beam, etc.) relative to an impacted substrate or the reflected angle of a beam of energy from a back reflected surface is approximately equal to 90°.

According to present aspects, standardized parts having known dimensions can be repeatably and non-destructively inspected with precision using the presently disclosed automated ultrasound back reflection methods, systems and apparatuses.

FIGS. 1 and 2 are cross-sectional views according to present aspects. As shown in FIG. 1, system 200 is oriented for inspection. System 200 includes substrate 202 to be non-destructively inspected according to present methods, systems, and apparatuses. Substrate 202 includes a first surface of the substrate 204 and a second surface of the substrate 206. Ultrasound array 208 includes a transducer for emitting and directing ultrasound signals and a receiver for receiving back reflected ultrasound signals including ultrasound signals that are back reflected from, for example (and as shown in FIGS. 2 and 3), the substrate second side 206, 306.

As further shown in FIG. 1, ultrasound array 208 includes a transducer/receiver at or near (e.g., proximate to) the ultrasound surface 210 of the ultrasound array 208. The ultrasound array 208 is in communication with a robotic array 211 that includes robotic arm 211a. According to a present aspect, ultrasound energy in the form of ultrasound signals 212a, 212b, 212c are directed from ultrasound array, into substrate 202, and are back reflected from substrate second side 206 to a receiver or receivers located in the ultrasound array 208. According to present aspects, a robotic array can include one or more robots, with each robot including one or more robotic arms, etc.

As shown in FIG. 1, the ultrasound array 208 can be placed into an initial position via the robotic arm 211a, or the ultrasound array 208 (equivalently referred to herein as "ultrasonic array 208") can be attached to the robot arm after the ultrasound array has been placed into an initial position. The robotic array 211 (and therefore the robotic arm 211a) is further in direct or indirect communication with a memory 213, a processor (not shown) that is in communication with the memory a controller, etc. such that information in the memory 213 that can be accessed and relayed to the robotic array 211. The robotic array can further comprise a controller 215a, or information in the memory 213 can be delivered to a controller 215 that is in communication with the robotic array 211 (e.g., accessed by the controller). According to present aspects, memory 213 contains a digitized pixel-by-pixel mapping of the second substrate side.

According to one aspect, the precise pixel-by-pixel mapping of the contours, irregularities, curves, etc., found in the substrate second side is done in advance, a priori, of the non-destructive inspection of substrate 202. Present aspects allow for the cataloging of component parts, etc. including composite material component parts made to specific dimensions, and where the dimensions and surface features of, for example, a particular model number of the part or component would be within close tolerances as the component is manufactured. In this aspect, a memory representing the digitized values of a plurality of differing component types can be created by scanning the component surfaces, digitizing the surface dimensions, and creating a precise complex geometric profile of the component surfaces, otherwise referred to equivalently herein as "cataloging".

As further shown in FIG. 1, in a first position, ultrasound signals 212a can be directed from the ultrasound array 208 that includes an ultrasonic probe through a first surface of the substrate 204 (referred to equivalently herein as the "substrate surface first side"), through the substrate 202, and to the second surface of the substrate 206 (referred to equivalently herein as the "substrate surface second side" or "back wall" or "substrate second side"). FIG. 1 shows the ultrasonic array 208 moved by the robotic assembly 211 (referred to equivalently herein as "robotic assembly" 211), and the robotic arm 211a, along the substrate first surface, and shown in three positions. In the first position ultrasound signals are sent through the substrate 202 to the substrate second side first region 206a of substrate second side 206, such that the signals impact the substrate second side 206 at substrate second side first region 206a at an angle that is substantially perpendicular to the first surface of the substrate 204. In the first position as shown in FIG. 1, the first surface of the substrate 204 and the substrate second side 206 are substantially parallel to one another. This parallel orientation of the two substrate sides to one another facilitates the ultrasounds signal 212a impacting the substrate second side 206 at substrate second side first region 206a at an angle that is substantially perpendicular (about 90°) to the substrate second side 206. Accordingly, back reflected ultrasound signals 212a are directed back to a receiver in the ultrasound array 208 at an angle that is substantially perpendicular to the first surface of the substrate 204.

In the second position, as shown in FIG. 1, the substrate second side 206 at substrate second side second region 206b is no longer parallel to the first surface of the substrate 204. As a result, the transmitted ultrasound signals 212b are adjusted to impact the substrate second surface at substrate second side second region 206b at an angle that is not substantially perpendicular to the first surface of the substrate, but that is perpendicular to the substrate second side 206 at substrate second side second region 206b. Typically, in the past, inspecting substrates having non-parallel surfaces would result in an attenuated ultrasound signal back reflected to the ultrasound array receiver. The diminution of received back reflected signal reduces imaging contrast and overall ultrasound imaging quality and negates the ability to evaluate a substrate for porosity since the true back wall echo amplitude is required to gauge porosity content of a substrate under evaluation.

According to present aspects, and as shown in FIG. 1, in the second stage, the degree to which the substrate first surface and the substrate second surface are not parallel to one another has been accounted for by the robotic array or the controller accessing the geometric profile of the substrate second surface such that the system 200, as shown in FIG. 1, recognizes a precise position within substrate second side second region 206b and supplies the complex geometric profile of the substrate second side second region 206b in a pixel-by-pixel surface characterization to the robotic array 211 controlling the orientation and position of the ultrasound array 208. According to one present aspects, the entire complex geometric profile of the second surface of the substrate has been previously assessed in pixel-by-pixel precision and stored in a memory or stored in a location that is accessible by the presently disclosed systems.

As shown in FIG. 1, as the ultrasound array is directed by the robotic array 211 and traverses the first surface of the substrate 204, the emitting angle of the ultrasound energy is continuously adjusted by the ultrasound array such that the incident angle of the ultrasound energy on the substrate second side closely approximates 90 degrees, or, in other words, the ultrasound energy is continuously adjusted such that the ultrasound energy strikes the second surface of the substrate at an angle that is substantially perpendicular to the second surface of the substrate, even though, at a pixel-by-pixel level, the surface characteristics of the second surface of the substrate may continuous change along its surface. The positioning of the receiver in the ultrasound array can be adjusted on the fly to receive the amount of back reflected ultrasound energy (e.g. ultrasound back reflected signal collection) from the second surface of the substrate that is required to produce the desired and predetermined degree of imaging contrast and resolution of the substrate.

In the third position, as shown in FIG. 1, ultrasound signals are sent through the substrate 202 to substrate second side third region 206c of substrate second side 206, such that the signals impact the substrate second side 206 at the substrate second side third region 206c at an angle that is again substantially perpendicular to the first surface of the substrate 204, because the second surface of the substrate is now again substantially perpendicular to the first surface of the substrate. As with the first position, as shown, this parallel orientation of the two substrate sides to one another facilitates the ultrasound signals 212c impacting the substrate second side 206 at an angle that is substantially perpendicular (an incident angle of ultrasound energy of about 90°) to the substrate second side 206. Accordingly, back reflected ultrasound signals 212c are directed back to a receiver in the ultrasound array 208 at an angle that is substantially perpendicular to the first surface of the substrate 204.

As stated above, and according to present aspects, the surface features of the second surface of the substrate, preferably on a pixel-by-pixel basis, are quantities having values that are catalogued and accessed by the present systems from, for example, a memory housing the accessible values. In one present aspect, the values representing the pixel-by-pixel geometric profile of the substrate are entered into the memory a priori. With the surfaces of a substrate entered into a memory (e.g., a catalogue, etc.) that is accessible (e.g., accessible by a controller, etc.) the present systems can direct and position the ultrasound array 208 including the ultrasound transducer 214 such that the ultrasound energy is incident upon the second surface of the substrate at an angle that is substantially perpendicular to the second surface of the substrate, even when the surface features of the second surface of the substrate change (e.g., such that the substrate surface first and second sides are not substantially parallel to one another).

The second surface of the substrate can represent complex geometric profiles including, for example, complex contours, irregular contours, regular contours, complex curves, etc. Such second side surface values can be particular to values assessed from inventoried parts that may be regularly used. In this way, a part can be identified as belonging to a particular SKU, for example, that can be recognized by the system by incorporating recognition optics, or the part SKU can be entered by an operator, as desired. In this way, the system will recognize the part being scanned, with the part under investigation having known dimensions along and through its length and width, including specific dimensions of both the first and especially the second substrate surface.

According to further aspects, if a "one-off" part is being non-destructively inspected (including, for example, a part that is not commonly used or is not routinely inventoried), characteristics of the substrate can be, for example, digitized such that pixel-by-pixel values of regions on the substrate second side can be assessed "on the fly", and in substantially real time, by an additional system that can include, for example, a laser array.

As shown in FIG. 2, according to further present aspects, a system 300 is shown including an ultrasound array 308 (equivalently referred to herein as an "ultrasonic array") that includes a transducer (e.g., an ultrasonic probe) and a receiver 314 at or near (e.g., proximate to) the ultrasound surface 310 of the ultrasound array 308. The ultrasound array 308 is in communication with a robotic array 311 that includes robotic arm 311a. According to a present aspect, ultrasound energy in the form of ultrasound signals are directed from ultrasound array, into substrate 302, and are back reflected from substrate second side 306 to a receiver or receivers located in the ultrasound array 308.

According to one aspect, as shown in FIG. 1, the precise pixel-by-pixel mapping of the complex contours, irregularities, complex curves, etc., found in the substrate second side is done in advance, a priori, of the non-destructive inspection of substrate 202, with the known values of the geometric profile of the substrate second side accessed from, for example, a memory.

As shown in FIG. 2 the precise pixel-by-pixel mapping of the complex contours, irregularities, complex curves, etc., found in the substrate second side is done by analyzing, in real time, the substrate second surface through the substantially simultaneous evaluation of the substrate second side that include digitizing the surface geometry profile and assigning geometry profile values of the surface of substrate second side (e.g., on a pixel-by-pixel basis) by analyzing the substrate second side surface with a digitizing array that can include, for example, a laser. In this aspect, surface characteristics of the substrate second side can be sent to a controller in substantially real time to direct the movement of the ultrasound array and the movement of the robotic array that can control the movement of the ultrasound array proximate to the substrate first surface. In addition, according to this aspect, surface characteristics of the substrate second side can be sent in substantially real time, to a memory. In this present aspect, the memory can be configured to accept, retain, and retrieve the values of the substrate second surface of the substrate or component comprising the substrate for later use; essentially creating an information base of any number of scanned substrates.

As further shown in FIG. 2, in a first position, a laser array 313 is activated and otherwise configured to direct laser beams 313a at the substrate second surface. Back reflected laser beams are reflected back from the second substrate surface to a receiver (not shown) in the laser array 313 such that signals are generated that characterize (e.g., digitize, etc.) the surface characteristics and geometry profile of the substrate second surface and send the signals in substantially real time to a robotic array 311 or to a controller 309 integrated into robotic array 311. The laser beams 313a provide information regarding the substrate second side 306 at substrate second side first region 306a during a laser scanning of the substrate second surface that can be a single pass or can be multiple passes depending on the characteristics of the scanning laser beam. As information is collected by the laser array 313 and communicated to a controller in communication with the robotic array, the ultrasound array that is in communication with the robotic array is moved along the length of the substrate proximate to the first surface of the substrate 304 such that the ultrasound signals 312a can be directed from the ultrasound array 308 through a first surface of the substrate 304 (referred to equivalently herein as the "substrate first surface", or "substrate surface first side") through the substrate 302, and to the second surface of the substrate 306 (referred to equivalently herein as the "substrate second surface" or "substrate surface second side" or "substrate second side") at substrate second side first region 306a such that the back reflected ultrasonic energy (e.g., in the form of ultrasound signals, etc.) are directed away from the substrate second side 306 at an angle that is substantially equivalent to the incident angle of the ultrasound energy at the substrate second side, with the incident and reflected angle maintained by the system 300 at an angle that is substantially perpendicular to the surface of the substrate second side 306 (e.g., about 90° relative to the substrate second side), and that is substantially perpendicular to the first surface of the substrate.

In the first position, as shown in FIG. 2, the first surface of the substrate 304 and the substrate second side 306 are substantially parallel to one another. This parallel orientation of the two substrate sides to one another facilitates the ultrasounds signal 312$a$ impacting the substrate second side 306 at an angle that is substantially perpendicular (about 90°) to the substrate second side 306 at substrate second side first region 306$a$. As explained above, maintaining the initial ultrasound emission and back reflection at a substantially equivalent angle, and at an angle that is substantially perpendicular relative to the substrate second surface, in a pixel-by pixel arrangement allows the ultrasound receiver to collect the greatest amount of back reflected ultrasound signaling. By capturing the greatest amount of back reflection ultrasound signaling, the system 300 generates significantly enhanced imaging comprising significantly enhanced contrast and a significantly improved non-destructive inspection of the substrate 302.

FIG. 2 shows the ultrasonic array 308 moved by the robotic assembly 311, and the robotic arm 311$a$, along the substrate first surface, and is shown in three positions. In the second position, as shown in FIG. 2, the substrate second side 306 at substrate second side second region 306$b$ is no longer parallel to the substrate first surface 304. The laser beams 313$b$ provide information regarding the substrate second surface 306 at substrate second side second region 306$b$ during a laser scanning of the substrate second surface 306. As information is collected by the laser array 313 and communicated to a controller in communication with the robotic array, the ultrasound array that is in communication with the robotic array is moved along the length of the substrate proximate to the first surface of the substrate 304 such that the ultrasound signals 312$b$ can be directed from the ultrasound array 308 through a first surface of the substrate 304 (referred to equivalently herein as the "substrate first surface", through the substrate 302, and to the substrate second side 306 (referred to equivalently herein as the "substrate second surface") at substrate second side second region 306$b$ such that the back reflected ultrasonic energy (e.g., in the form of ultrasound signals, etc.) are directed away from the substrate second side 306 at an angle that is substantially equivalent to the incident angle of the ultrasound energy at the substrate second side, with the incident and reflected angle maintained by the system 300 at an angle that is substantially perpendicular to the surface of the substrate second side 306 (e.g., about 90° relative to the substrate second side). Accordingly, the transmitted ultrasound signal 312$b$ is adjusted to impact the substrate second surface at substrate second side second region 306$b$ at an angle that is not substantially perpendicular to the first surface of the substrate 304, but that is perpendicular to the substrate second side 306 at substrate second side second region 306$b$.

According to present aspects, and as shown in FIG. 2, in the second position, the degree to which the substrate first surface and the substrate second surface are not parallel to one another has been accounted for by the robotic array or the controller receiving geometric profile signaling of the substrate second surface from laser 313 (equivalently referred to herein as "laser array 313" or "laser assembly 313"), such that the system 300 as shown in FIG. 3 recognizes a precise position within substrate second side second region 306$b$ and supplies the complex geometric profile of substrate second side second region 306$b$ in a pixel-by-pixel surface characterization to the robotic array 311 or the controller 309 controlling the orientation and position of the robotic array 311 and, by extension, the ultrasound array 308.

As shown in FIG. 2, as the ultrasound array is directed by the robotic array 311 and traverses the first surface of the substrate 304, the emitting angle of the ultrasound energy is continuously adjusted by the ultrasound array (due to the substantially continuous signaling of the laser array 313 to a controller responsible for controlling the movement of the ultrasound array 308) such that the incident angle of the ultrasound energy on the substrate second side closely approximates 90 degrees, or, in other words, the ultrasound energy is continuously adjusted such that the ultrasound energy strikes the second surface of the substrate at an angle that is substantially perpendicular to the second surface of the substrate, even though, at a pixel-by-pixel level, the surface characteristics of the second surface of the substrate may continuously change along its surface.

As with the system 200 shown in FIG. 1, in the system 300, the positioning of the receiver in the ultrasound array can be adjusted on-the-fly (e.g. in substantially real time) to receive the amount of back reflected ultrasound energy (e.g. ultrasound back reflected signal collection) from the second surface of the substrate that is required to produce the desired and predetermined degree of imaging contrast and resolution of the substrate.

FIG. 2 shows an alternate aspect in the second position, wherein the ultrasound array is directed by the robotic array 311 and traverses the first surface of the substrate 304. While the emitting angle of the ultrasound energy can be continuously adjusted by the ultrasound array (due to the substantially continuous signaling of the laser array 313 to a controller responsible for controlling the movement of the ultrasound array 308) such that the incident angle of the ultrasound energy on the substrate second side closely approximates 90 degrees, the ultrasound array 308 can also incorporate multiple receivers 316 to capture back reflected ultrasonic signals 312$c$ that are not back reflected to the ultrasound array from the substrate second side at an angle that is substantially equivalent to the incident angle of the ultrasonic beam.

In the third position, as shown in FIG. 2, the ultrasound array has proceeded along and proximate to the substrate first surface and is continuing a non-destructive inspection along the length of substrate 302. The substrate second side 306 at substrate second side third region 306$c$ is again substantially parallel to the first surface of the substrate 304. The laser beams 313$c$ provide information regarding the substrate second side 306 at substrate second side third region 306$c$ during a laser scanning of the substrate second side 306. As information is collected by the laser array 313 and communicated to a controller in communication with the robotic array, the ultrasound array that is in communication with the robotic array is moved along the length of the substrate proximate to the first surface of the substrate 304 such that, as shown in the substrate second side third region 306$c$ in FIG. 2, the ultrasound signals 312$d$ can be directed from the ultrasound array 308 through a first surface of the substrate 304 (referred to equivalently herein as the "substrate first surface", through the substrate 302, and to the substrate second side 306 (referred to equivalently herein as the "substrate second surface") at substrate second side third region 306$c$ such that the back reflected ultrasonic energy (e.g., in the form of ultrasound signals, etc.) are directed away from the substrate second side 306 at an angle that is substantially equivalent to the incident angle of the ultrasound energy at the substrate second side, with the incident and reflected angle maintained by the system 300 at an angle that is substantially perpendicular to the surface of the substrate second side 306 (e.g., about 90° relative to the substrate second side 306, at substrate second side third region 306c) and such that the incident angle of the ultrasound energy on the substrate second side closely approximates 90 degrees. In other words, the ultrasound energy is continuously adjusted, in substantially real time, such that the ultrasound energy strikes the second surface of the substrate at an angle that is substantially perpendicular to the second surface of the substrate, even though, at a pixel-by-pixel level, the surface characteristics of the second surface of the substrate may continuously change along its surface. Further, since the first surface of the substrate and the second surface of the substrate are now substantially parallel to one another in the third position, the incident and reflected angle maintained by the system 300 at an angle that is substantially perpendicular to the first surface of the substrate 304.

As shown in FIG. 2, as with the system 200 shown in FIG. 1, the positioning of the receiver in the ultrasound array can be adjusted on-the-fly (e.g. in substantially real time) to receive the amount of back reflected ultrasound energy (e.g. ultrasound back reflected signal collection) from the second surface of the substrate that is required to produce the desired and predetermined degree of imaging contrast and resolution of the substrate. As shown in FIG. 2, ultrasound signals are sent through the substrate 302 to substrate second side second third region 306c of substrate second side 306, such that the signals impact the substrate second side 306 at substrate second side third region 306c at an angle that is again substantially perpendicular to the first surface of the substrate 304, because the second surface of the substrate is now again substantially perpendicular to the first surface of the substrate.

As with the first position, as shown in FIG. 2, in the third position, the parallel orientation of the two substrate sides to one another facilitates the ultrasound signals 312d impacting the substrate second side 306 at an angle that is substantially perpendicular (an incident angle of ultrasound energy of about 90°) to the substrate second side 306. Accordingly, back reflected ultrasound signals 312d are directed back to a receiver in the ultrasound array 308 at an angle that is substantially perpendicular to the first surface of the substrate 304.

FIG. 3 is a non-limiting block diagram outlining present aspects of presently disclosed methods. As shown FIG. 3, method 400 includes selecting 402 a complex structure that can have a complex geometric profile on at least one surface for non-destructive ultrasonic inspection. According to present aspects, including those shown in FIG. 1 and FIG. 2, method 400 further includes accessing 404 a 3D model that represents a substrate second surface for the substrate being non-destructively inspected. According to further aspects, the values can be obtained a priori from a scan of the actual structure being evaluated, or from a memory created by accessing and/or inputting the geometric profile (e.g., in the form of digitized values) of the substrate second surface taken from or otherwise relating to a known (e.g., a stock or otherwise inventoried) "part" or component. The method 400, further includes orienting 406 a robot structure (equivalently referred to herein as a "robotic array"), with the robotic array in communication with an ultrasonic array and with the robotic array configured to move and/or orient the ultrasonic array during the non-destructive ultrasonic inspection of the substrate structure being inspected. Method 400 further includes, orienting 408 a 3D model matching the substrate under inspection, and planning 410 a robot scan path of the 3-D model to determine ultrasonic phase angles for optimum ultrasonic data-collection from the substrate second side, followed by using a model geometry 412 of the 3-D model geometry (e.g., in conjunction with a computer, etc.) to predict ultrasound back reflection angles from the substrate second side. Such information and data collection can predict, for example, path orientations during scanning, path lengths, material coverage, etc., for at least the purpose of ensuring normalized coverage of the substrate structure volume during the non-destructive ultrasound inspection. Method 400 further shows conducting 414 an automated ultrasound array scan of the substrate structure via the orientation assistance of the robotic array for the purpose of implementing designed and directed ultrasound beam steering angles at a pixel-by-pixel level across the geometric profile of the substrate second side.

FIG. 4 is a flowchart illustrating a method according to presenting aspects. As shown in FIG. 4, a method 500 is outlined including orienting 502 and ultrasonic array proximate to a first surface of the substrate (equivalently referred to herein as "substrate first surface") and orienting 504 a controller in communication with the ultrasonic array. Method 500 further includes accessing 506 a complex geometric profile for each location on the substrate second side, with each location referring to the capability, according to present aspects, of obtaining complex geometric profile values for each location on the substrate second surface on a pixel-by-pixel basis. Method 500 further includes controlling 508 orientation and location of the ultrasonic array in response to the complex geometric profile values that can be in the form of complex geometric profile signals and directing 510 ultrasonic signals from the ultrasonic array to the substrate second side in response to the complex geometric profile information (such as, for example, complex geometric profile information obtained by the controller in the ultrasonic array) and directing 512 back reflection ultrasound signals from the substrate second side to an ultrasound receiver in the ultrasound array, and receiving 514 back reflection ultrasonic signals at the receiver. The method outlined in FIG. 4 can implement the apparatuses and systems set forth in FIG. 1 and/or FIG. 2.

FIG. 5 is a flowchart illustrating a method according to presenting aspects. As shown in FIG. 5, a method 600 is outlined including orienting 502 and ultrasonic array proximate to a first surface of the substrate (equivalently referred to herein as "substrate first surface") and orienting 504 a controller in communication with the ultrasonic array. Method 600 further includes accessing 506 a complex geometric profile for each location on the substrate second side, with each location referring to the capability, according to present aspects, of obtaining complex geometric profile values for each location on the substrate second surface on a pixel-by-pixel basis. Method 600 further includes controlling 508 orientation and location of the ultrasonic array in response to the complex geometric profile values that can be in the form of complex geometric profile signals and directing 510 ultrasonic signals from the ultrasonic array to the substrate second side in response to the complex geometric profile information (such as, for example, complex geometric profile information obtained by the controller in the ultrasonic array) and directing 512 back reflection ultrasound signals from the substrate second side to an ultrasound receiver in the ultrasound array, and receiving 514 back reflection ultrasonic signals at the receiver. Method 600 further includes moving 616 ultrasonic array in a predetermined direction relative to a first surface of the substrate in response to a complex geometric profile and directing and/or orienting 618 ultrasonic signals the second surface of the substrate that is substantially perpendicular to the second surface of the substrate. The method outlined in FIG. 5 can implement the apparatuses and systems set forth in any of FIG. 1, FIG. 2.

FIG. 6 is a flowchart illustrating a further method 700 according to present aspects where the "accessing" of the complex geometric profile is obtained by a scanning of the complex geometric profile of a substrate second side as an alternative to the accessing of complex geometric profile values from, for example, a memory. As shown in FIG. 6, method 700 includes orienting 702 an ultrasonic array proximate to a substrate (e.g., proximate to a substrate first surface), orienting 704 a scanning device that can be, for example, a laser array, that is configured to dimensionally scan a second surface of the substrate, and dimensionally scanning 706 a complex geometric profile of the second surface of the substrate. Method 700 further includes, according to present aspects, providing 708 a controller that is configured to be in communication with both the ultrasonic array and the scanning device, and accessing 710 a complex geometric profile for each location on the substrate second side, for example, on a pixel-by-pixel basis. Method 700 further includes controlling 712 orientation and location of the ultrasonic array in response to the complex geometric profile, directing 714 ultrasonic signals from the ultrasonic array in response to the complex geometric profile, directing 716 back reflection ultrasonic signals from the substrate second side to a receiver, such as, for example an ultrasonic receiver, and receiving 718 back reflection ultrasonic signals at the receiver. The method outlined in FIG. 6 can implement the apparatuses and systems set forth in any of FIG. 1, FIG. 1, FIG. 3 and/or FIG. 4.

FIG. 7 is a flowchart illustrating a further method 800 according to present aspects where the "accessing" of the complex geometric profile is obtained by a scanning of the complex geometric profile of a substrate second side as an alternative to the accessing of complex geometric profile values from, for example, a memory. As shown in FIG. 7, method 800 includes orienting 702 an ultrasonic array proximate to a substrate (e.g., proximate to a substrate first surface), orienting 704 a scanning device that can be, for example, a laser array, that is configured to dimensionally scan a second surface of the substrate, and dimensionally scanning 706 a complex geometric profile of the second surface of the substrate. Method 700 further includes, according to present aspects, providing 708 a controller that is configured to be in communication with both the ultrasonic array and the scanning device, and accessing 710 a complex geometric profile for each location on the substrate second side, for example, on a pixel-by-pixel basis. Method 700 further includes controlling 712 orientation and location of the ultrasonic array in response to the complex geometric profile, directing 714 ultrasonic signals from the ultrasonic array in response to the complex geometric profile, directing 716 back reflection ultrasonic signals from the substrate second side to a receiver, such as, for example an ultrasonic receiver, and receiving 718 back reflection ultrasonic signals at the receiver. Method 800 further includes moving 720 ultrasonic array in a predetermined direction relative to a first surface of the substrate in response to a complex geometric profile and directing and/or orienting 722 ultrasonic signals the second surface of the substrate that is substantially perpendicular to the second surface of the substrate. The method outlined in FIG. 7 can implement the apparatuses and systems set forth in any of FIG. 1, FIG. 2, FIG. 3, FIG. 4, and/or FIG. 6.

FIG. 8 is a flowchart illustrating aspects of the present disclosure. As shown in FIG. 8, method 900 includes accessing 902 memory or inputting spatial coordinates of a substrate surface, with the spatial coordinates including, for example, digitized complex geometric profiles of a substrate second surface. According to present aspects, the spatial coordinates can be accessed either from a memory where, for example complex geometric profiles have been determined a priori by scanning a substrate second side, or by inputting values understood to pertain to a complex geometric profile of an object by identifying a particular component known to have a particular complex geometric profile. That is, if a particular part or component is to be non-destructively inspected and the part is a known part or component that has previously been scanned or otherwise analyzed for the purpose of determining the complex geometric profile of such part or component, the previously assessed complex geometric profile values (also referred to as "spatial coordinates") can be accessed, for example from a catalogue or memory by scanning a bar code that identifies a particular part or component, or by entering or inputting a particular part or model number, etc. Method 900 further includes controlling 904 movement of a robot in communication with an ultrasound transducer/receiver array wherein the robot is configured to control the movement of an ultrasound array, and delivering 906 an ultrasound signal (referred to equivalently herein as an ultrasonic signal") that is substantially perpendicular to a substrate second surface as defined herein. Method 900 further includes optionally comparing back reflection angle(s) from a substrate second surface to transmittance angle(s) of an emitted ultrasonic beam that is delivered from an ultrasonic array. The method outlined in FIG. 8 can implement the apparatuses and systems set forth in any of FIG. 1, FIG. 2, FIG. 3, FIG. 4, FIG. 5, FIG. 6, and/or FIG. 7.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item can be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The presently disclosed aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method comprising:
orienting an ultrasonic probe proximate to a substrate, said substrate comprising a first surface of the substrate and a second surface of the substrate, said second surface of the substrate comprising a complex geometry, said complex geometry comprising a complex geometry profile, and said ultrasonic probe comprising a transducer and a receiver;
orienting a controller in communication with the ultrasonic probe, said controller configured to access the complex geometry profile;
accessing the complex geometry profile;
controlling the orientation of the ultrasonic probe in response to the complex geometry profile;
directing ultrasonic energy from the ultrasonic probe in response to the complex geometry profile;
directing ultrasonic energy from the ultrasonic probe to the substrate and through the first surface of the substrate to the second surface of the substrate;
directing back reflection ultrasonic energy from the second surface of the substrate to the receiver;
receiving back reflection ultrasonic energy from the second surface of the substrate at the receiver; and
wherein the receiver is positioned to receive back reflection ultrasonic energy from the second surface of the substrate in response to the complex geometry profile.

2. The method of claim 1, further comprising:
scanning the ultrasonic probe in a predetermined direction relative to the first surface of the substrate in response to the complex geometry profile.

3. The method of claim 1, further comprising:
accessing the complex geometry profile, said complex geometry profile comprising profile information at a pixel level.

4. The method of claim 1, wherein the complex geometry is a non-planar geometry.

5. The method of claim 1, wherein, in the step of directing ultrasonic energy from the ultrasonic probe in response to the complex geometry profile, further comprising:
directing ultrasonic energy from the transducer to the second surface of the substrate in an orientation that is perpendicular to the second surface of the substrate.

6. The method of claim 1, wherein, in the step of directing back reflection ultrasonic energy from the second surface of the substrate to the receiver, further comprising:
directing back reflection ultrasonic energy from the second surface of the substrate to the receiver in an orientation that is perpendicular to the second surface of the substrate.

7. The method of claim 1, wherein, in the step of accessing the complex geometry profile, said complex geometry profile is accessed from a memory.

8. The method of claim 1, wherein the controller is in communication with a robot.

9. The method of claim 8, wherein the robot is configured to move the ultrasonic probe relative to the substrate.

10. A method comprising:
orienting an ultrasonic probe proximate to a substrate, said substrate comprising a first surface of the substrate and a second surface of the substrate, said second surface of the substrate comprising a complex geometry, said complex geometry comprising a complex geometry profile, and said ultrasonic probe comprising a transducer and a receiver;
orienting a scanning device configured to dimensionally scan the second surface of the substrate;
dimensionally scanning the complex geometry profile with the scanning device;
providing a controller, said controller in communication with the ultrasonic probe, said controller further in communication with the scanning device;
accessing the complex geometry profile obtained by the scanning device;
controlling the ultrasonic probe in response to the complex geometry profile obtained by the scanning device;
directing ultrasonic energy from the ultrasonic probe to the substrate and through the first surface of the substrate to the second surface of the substrate;
directing ultrasonic energy from the ultrasonic probe in response to the complex geometry profile;
directing back reflection ultrasonic energy from the second surface of the substrate to the receiver;
receiving back reflection ultrasonic energy from the second surface of the substrate at the receiver; and
wherein the receiver is positioned to receive back reflection ultrasonic energy from the second surface of the substrate in response to the complex geometry profile.

11. The method of claim 10, further comprising:
moving the ultrasonic probe in a predetermined direction relative to the first surface of the substrate in response to the complex geometry profile.

12. The method of claim 10, wherein the complex geometry is a non-planar geometry.

13. The method of claim 10, wherein, in the step of directing ultrasonic energy from the ultrasonic probe in response to the complex geometry profile, the method further comprising:
directing ultrasonic energy from the transducer to the second surface of the substrate in an orientation that is perpendicular to the second surface of the substrate.

14. The method of claim 10, wherein, in the step of directing back reflection ultrasonic energy from the second surface of the substrate to the receiver, the method further comprising:
directing back reflection ultrasonic energy from the second surface of the substrate to the receiver in an orientation that is perpendicular to the second surface of the substrate.

15. The method of claim 10, wherein the controller is in communication with a robot.

16. The method of claim 15, wherein the robot is configured to move the ultrasonic probe relative to the substrate.

17. A system for non-destructively scanning a substrate comprising:
an ultrasonic probe, said ultrasonic probe comprising a transducer and a receiver, said ultrasonic probe configured to scan a substrate, said substrate comprising a first surface of the substrate and a second surface of the substrate, said second surface of the substrate comprising a complex geometry profile; and
a controller configured to be in communication with the ultrasonic probe, said controller configured to access the complex geometry profile;
a robotic array in communication with the controller;
wherein said transducer is configured to direct ultrasonic energy from the transducer to the first surface of the substrate, and from the first surface of the substrate through the substrate to the second surface of the substrate in response to the complex geometry profile; and
wherein, during a scan of the substrate, said transducer is further configured to direct ultrasonic energy from the transducer to the second surface of the substrate in a direction that remains perpendicular to the second surface of the substrate during a scan duration.

18. The system of claim 17, further comprising a memory, said memory comprising the complex geometry profile.

19. The system of claim 17, further comprising:
a scanning device, said scanning device configured to scan the complex geometry profile of the second surface of the substrate, said scanning device configured to be in communication with the controller.

20. The system of claim 17, further comprising:
a processor in communication with the receiver, said processor configured to receive signals sent from the receiver.

21. The system of claim 19, wherein the scanning device comprises a laser.

* * * * *